(12) United States Patent  (10) Patent No.: US 9,168,922 B1
Martin  (45) Date of Patent: Oct. 27, 2015

(54) COMPUTER-IMPLEMENTED METHODS AND SYSTEMS FOR PREDICTING AN AREA TO BE TRAVERSED BY A MOVING VEHICLE

(71) Applicant: Jaybridge Robotics, Inc., Cambridge, MA (US)

(72) Inventor: Bradly A. Martin, Cambridge, MA (US)

(73) Assignee: Jaybridge Robotics, Inc., Cambridge, MA (US)

( * ) Notice: Subject to any disclaimer, the term of this patent is extended or adjusted under 35 U.S.C. 154(b) by 0 days.

(21) Appl. No.: 14/296,896

(22) Filed: Jun. 5, 2014

(51) Int. Cl.
 *G01C 22/00* (2006.01)
 *G05D 1/00* (2006.01)
 *B60W 30/095* (2012.01)
(52) U.S. Cl.
 CPC ....... *B60W 30/0953* (2013.01); *B60W 2510/20* (2013.01); *B60W 2520/06* (2013.01); *B60W 2520/10* (2013.01); *B60W 2520/12* (2013.01); *B60W 2520/14* (2013.01); *B60W 2720/24* (2013.01)
(58) Field of Classification Search
 CPC . G05D 1/0272; G05D 1/0255; G05D 1/0278; G05D 1/027; G05D 1/0274
 USPC .......................................................... 701/25
 See application file for complete search history.

(56) References Cited

U.S. PATENT DOCUMENTS

| | | | |
|---|---|---|---|
| 5,995,902 A | 11/1999 | Monson | |
| 6,076,025 A | 6/2000 | Ueno et al. | |
| 6,615,108 B1 | 9/2003 | Peless et al. | |
| 6,885,912 B2 | 4/2005 | Peless et al. | |
| 6,907,336 B2 | 6/2005 | Gray et al. | |
| 7,010,425 B2 | 3/2006 | Gray et al. | |
| 7,155,309 B2 | 12/2006 | Peless et al. | |
| 7,173,391 B2 | 2/2007 | Jones et al. | |
| 7,228,214 B2 | 6/2007 | Flann et al. | |
| 7,349,759 B2 | 3/2008 | Peless et al. | |
| 7,388,343 B2 | 6/2008 | Jones et al. | |
| 7,429,843 B2 | 9/2008 | Jones et al. | |
| 7,451,030 B2 | 11/2008 | Eglington et al. | |
| 7,502,678 B2 | 3/2009 | Diekhans et al. | |
| 7,591,226 B2 | 9/2009 | Dix et al. | |
| 7,689,356 B2 | 3/2010 | Dix et al. | |
| 7,706,948 B2 | 4/2010 | Dix et al. | |
| 7,715,966 B2 | 5/2010 | Dix et al. | |
| 7,747,370 B2 | 6/2010 | Dix | |
| 7,873,437 B2 | 1/2011 | Aldred et al. | |
| 7,877,182 B2 | 1/2011 | Dix et al. | |
| 8,060,299 B2 | 11/2011 | Gharsalli et al. | |
| 8,204,654 B2 | 6/2012 | Sachs et al. | |
| 8,466,807 B2 | 6/2013 | Mudalige | |
| 2004/0193348 A1 | 9/2004 | Gray et al. | |
| 2010/0262342 A1 | 10/2010 | Dix et al. | |

FOREIGN PATENT DOCUMENTS

| | | | |
|---|---|---|---|
| EP | 2208654 | * | 7/2010 |
| EP | 2208654 A1 | | 7/2010 |

* cited by examiner

*Primary Examiner* — Maceeh Anwari
(74) *Attorney, Agent, or Firm* — Rajesh Vallabh; Foley Hoag LLP (57) ABSTRACT

Computer-implemented methods and systems are provided for calculating a polygon that estimates the area to be traversed by a moving ground vehicle by merging polygons representing static poses of the vehicle at different times.

21 Claims, 7 Drawing Sheets

COMPUTER-IMPLEMENTED METHODS AND SYSTEMS FOR PREDICTING AN AREA TO BE TRAVERSED BY A MOVING VEHICLE

BACKGROUND

The present application relates generally to computer-implemented methods and systems for predicting the area to be occupied and traversed by a ground vehicle moving over a given distance.

BRIEF SUMMARY OF THE DISCLOSURE

In accordance with one or more embodiments, a computer-implemented method is provided for predicting an area to be traversed by a moving vehicle as it travels a given distance. The method comprises the steps of: (a) receiving, at a computer system, one or more dynamic parameters describing a state of the vehicle at a given time including a current speed, yaw rate, initial position, and initial heading of the vehicle; (b) generating, by the computer system, a sequence of vehicle configuration states based on the one or more dynamic parameters, including at least an initial vehicle configuration state at the initial position of the vehicle and a final vehicle configuration state at a final position of the vehicle after the vehicle has traveled the given distance, each vehicle configuration state indicating an outline of a predicted area to be occupied by the vehicle at a different point in time as the vehicle travels the given distance; (c) generating, by the computer system, two sequences of one-sided polylines corresponding to the sequence of vehicle configuration states generated in step (b), the two sequences of one-sided polylines comprising a right side sequence of one-sided polylines, with each polyline outlining the right side of the vehicle for a vehicle configuration state and a left side sequence of one-sided polylines, with each polyline outlining the left side of the vehicle for a vehicle configuration state; (d) merging the right side sequence of one-sided polylines, by the computer system, to produce a single right side polyline, and merging the left side sequence of one-sided polylines, by the computer system, to produce a single left side polyline, and (e) combining the single right side polyline and the single left side polyline, by the computer system, to form a single closed polygon representing the predicted area to be traversed by the moving vehicle.

In accordance with one or more further embodiments, a computer system comprises at least one processor, memory associated with the at least one processor, and a program supported in the memory for predicting an area to be traversed by a moving vehicle as it travels a given distance. The program contains a plurality of instructions which, when executed by the at least one processor, cause the at least one processor to: (a) receive one or more dynamic parameters describing a state of the vehicle at a given time including a current speed, yaw rate, initial position, and initial heading of the vehicle; (b) generate a sequence of vehicle configuration states based on the one or more dynamic parameters, including at least an initial vehicle configuration state at the initial position of the vehicle and a final vehicle configuration state at a final position of the vehicle after the vehicle has traveled the given distance, each vehicle configuration state indicating an outline of a predicted area to be occupied by the vehicle at a different point in time as the vehicle travels the given distance; (c) generate two sequences of one-sided polylines corresponding to the sequence of vehicle configuration states generated in (b), the two sequences of one-sided polylines comprising a right side sequence of one-sided polylines, each polyline outlining the right side of the vehicle for a vehicle configuration state and a left side sequence of one-sided polylines, each polyline outlining the left side of the vehicle for a vehicle configuration state; (d) merge the right side sequence of one-sided polylines to produce a single right side polyline, and merge the left side sequence of one-sided polylines to produce a single left side polyline, and (e) combine the single right side polyline and the single left side polyline to form a single closed polygon representing the predicted area to be traversed by the moving vehicle.

In accordance with one or more further embodiments, a computer program product is provided for predicting an area to be traversed by a moving vehicle as it travels a given distance. The computer program product resides on a non-transitory computer readable medium having a plurality of instructions stored thereon which, when executed by a computer processor, cause that computer processor to: (a) receive one or more dynamic parameters describing a state of the vehicle at a given time including a current speed, yaw rate, initial position, and initial heading of the vehicle; (b) generate a sequence of vehicle configuration states based on the one or more dynamic parameters, including at least an initial vehicle configuration state at the initial position of the vehicle and a final vehicle configuration state at a final position of the vehicle after the vehicle has traveled the given distance, each vehicle configuration state indicating an outline of a predicted area to be occupied by the vehicle at a different point in time as the vehicle travels the given distance; (c) generate two sequences of one-sided polylines corresponding to the sequence of vehicle configuration states generated in (b), the two sequences of one-sided polylines comprising a right side sequence of one-sided polylines, each polyline outlining the right side of the vehicle for a vehicle configuration state and a left side sequence of one-sided polylines, each polyline outlining the left side of the vehicle for a vehicle configuration state; (d) merge the right side sequence of one-sided polylines to produce a single right side polyline, and merge the left side sequence of one-sided polylines to produce a single left side polyline, and (e) combine the single right side polyline and the single left side polyline to form a single closed polygon representing the predicted area to be traversed by the moving vehicle.

DETAILED DESCRIPTION

Various embodiments disclosed herein relate to a computer-implemented method and system for calculating a polygon that estimates the area to be traversed by a moving ground vehicle by efficiently merging polygons representing static poses of the vehicle at different times. The system operates in conjunction with other known systems that compute static pose polygons and that determine the position, orientation, and velocity of the vehicle at a given time.

The methods and systems disclosed herein have a variety of applications including, e.g., in safety systems for anticipating and avoiding vehicle collisions in real-time, particularly for automatically driven vehicles. The methods and systems also have utility in path planning for such vehicles.

The processes for estimating the area traversed by a vehicle described herein may be implemented in software, hardware, firmware, or any combination thereof. The processes are preferably implemented in one or more computer programs executing on a programmable computer system, including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer system, the set of instructions may be stored in another computer memory (e.g., in a hard disk drive, or in a removable memory such as an optical disk, external hard drive, memory card, or flash drive) or stored on another computer system and downloaded via the Internet or other network.

In various exemplary embodiments disclosed herein, the methods and systems for determining the area traversed by a vehicle assume that the vehicle is traveling with a constant turning radius over a short distance. However, the methods and systems work equally well for any object moving on a plane, given sufficiently accurate estimation of the pose of the object as projected onto the plane over time.

Figure 1:
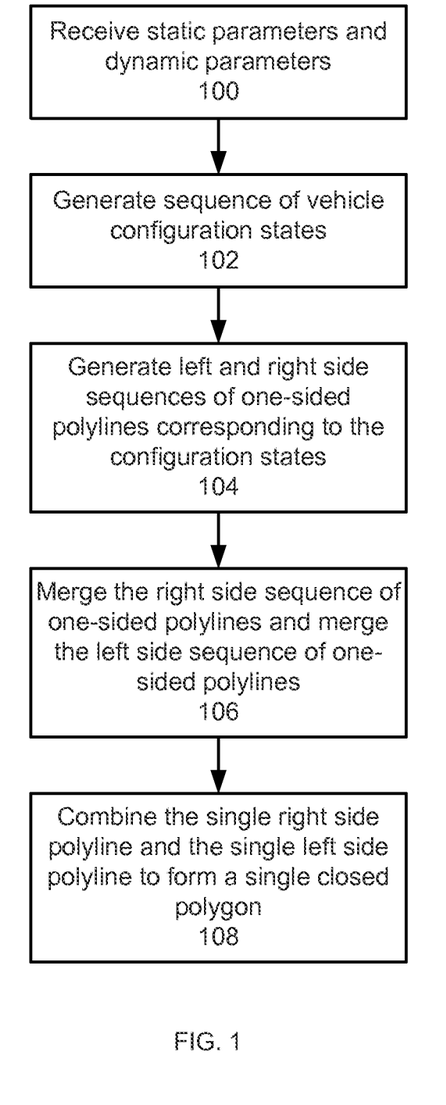
FIG. 1 is a simplified flowchart generally illustrating the process of predicting an area to be traversed by a moving vehicle in accordance with one or more embodiments.

FIG. 1 is a flow chart illustrating an exemplary method for calculating a polygon that estimates the area traversed by a moving ground vehicle in accordance with one or more embodiments.

As will be described in further detail below, given certain static parameters (which are tuned for a specific vehicle and application) and dynamic parameters (which describe the state of the vehicle at a given time) received at 100, a motion prediction module of the system is invoked to estimate the position, orientation, and configuration of the vehicle as time goes forward through a sequence of vehicle configuration states at 102.

Then, a static pose generation module of the system is invoked to generate two sequences of open polygon paths at 104. The first sequence estimates the outline of the area occupied by the right side of the vehicle (e.g., the right-half of the vehicle) at different points in time as time goes forward. The second sequence does the same for the left side of the vehicle (e.g., the left-half of the vehicle).

The static pose open polygon paths for the right side, which may or may not overlap, are connected and merged into a single open polygon path, which estimates the area swept by the right side of the vehicle as it continuously moves from its initial to final position at 106. Merging is performed using one of two techniques discussed below.

Merging is also performed for the paths representing the left side of the vehicle.

The merged paths for the right and left sides are joined to form a single closed polygon at 108, which estimates the area swept by the entire vehicle as it continuously moves from its initial to final position.

Static and Dynamic Parameters

Figure 2:
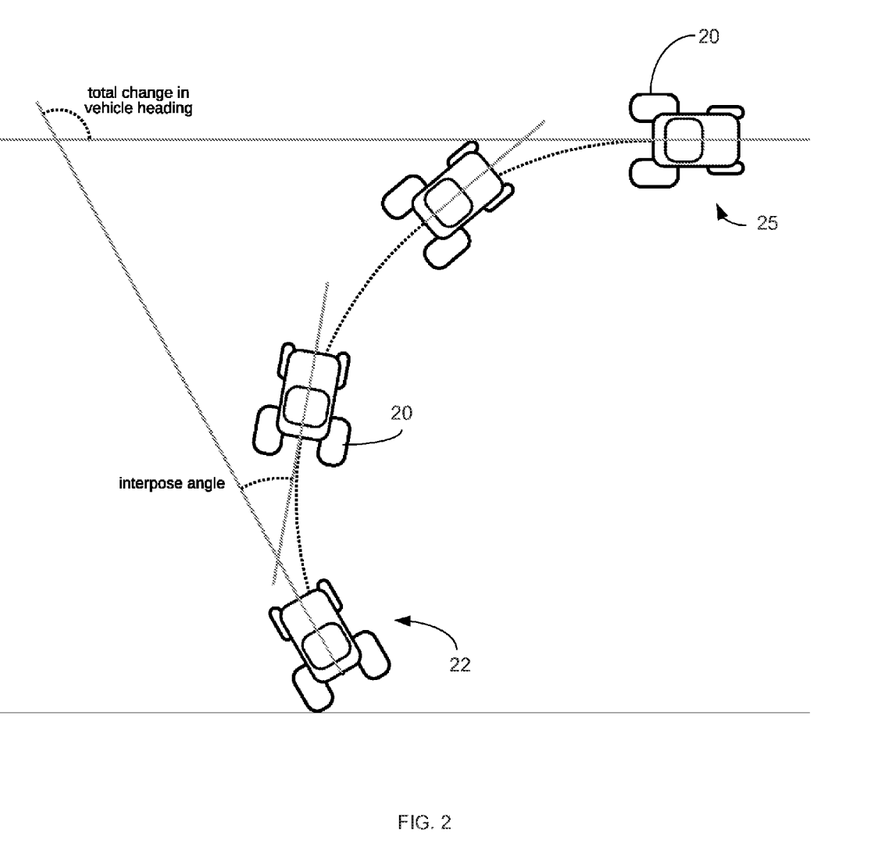
FIG. 2 is a simplified diagram illustrating an evaluation of static parameters for a vehicle in accordance with one or more embodiments.

The motion prediction module is invoked with a set of static parameters that are tuned for the specific application at hand. These parameters affect the trade-off between estimation precision and execution time. Parameters can include the small angle threshold parameter, which as shown in FIG. 2, is the maximum total change in the heading of the vehicle 20 (between the initial position 22 and the final position 25) that will be considered a 'straight' path, e.g., 5 degrees. The maximum interpose angle parameter is the maximum change in vehicle heading between any two pose polygon paths, e.g., 15 degrees. The interpolated point count parameter is, for each segment in a static pose polygon, the number of additional points to insert on that segment, e.g., 3.

Figure 3:
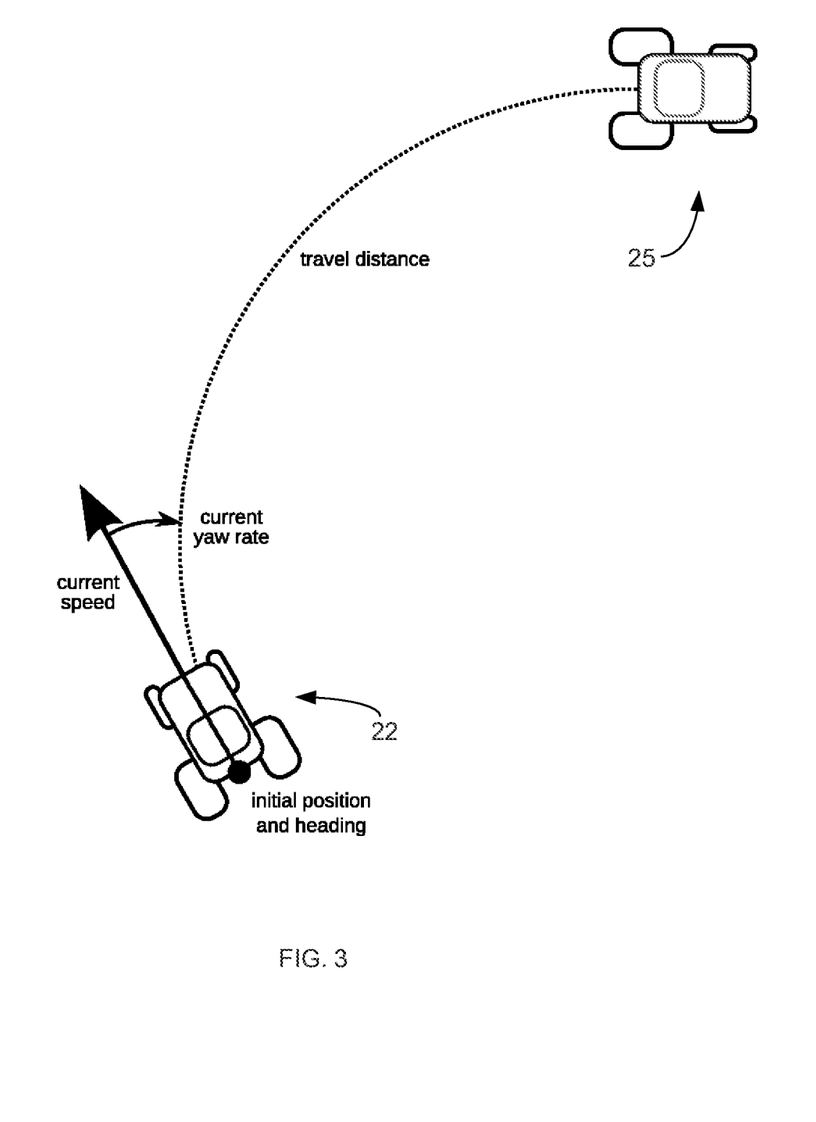
FIG. 3 is a simplified diagram illustrating an evaluation of dynamic parameters for a vehicle in accordance with one or more embodiments.

The motion prediction module is also invoked with a set of dynamic parameters determined by the state of the vehicle 20. As shown in FIG. 3, the travel distance parameter is the path distance that the vehicle will travel between initial and final positions 22, 25, e.g., a distance calculated by a braking model based on the vehicle's current speed and load. The current speed parameter is the current speed of the vehicle. The current yaw rate parameter is the current rate of change of the vehicle heading. The initial position and heading parameter is the initial position and heading of the vehicle.

Motion Prediction and Static Pose Generation

Figure 4:
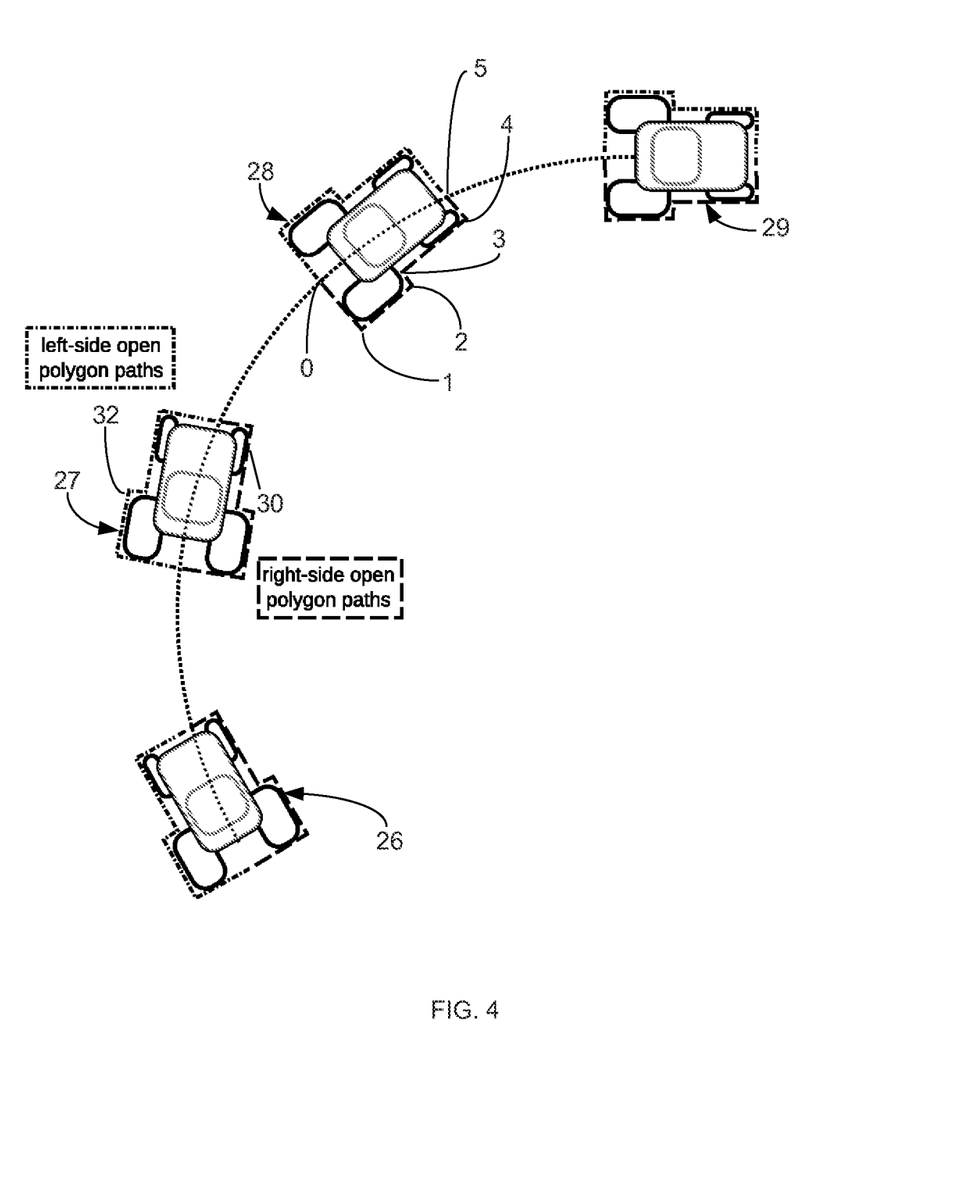
FIG. 4 is a simplified diagram illustrating left and right sequences of open polygon paths for each predicted pose of a vehicle in accordance with one or more embodiments.
Figure 5A:
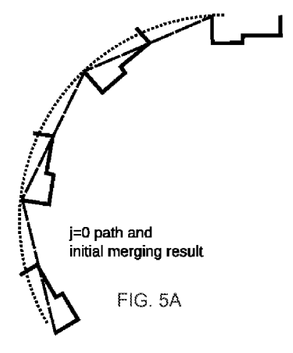
FIGS. 5A-5K are simplified diagrams illustrating right-side polyline merging in accordance with one or more embodiments.
Figure 5B:
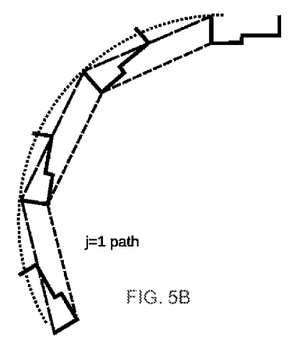
Figure 5C:
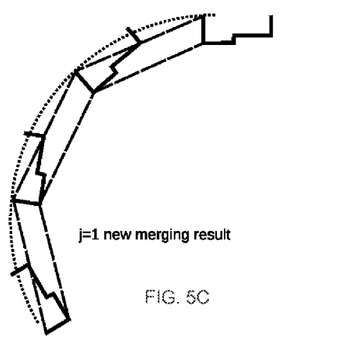
Figure 5D:
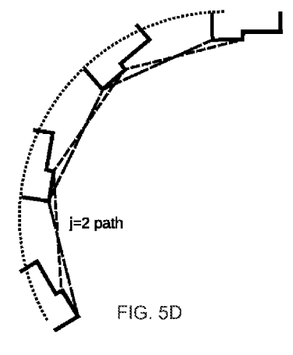
Figure 5E:
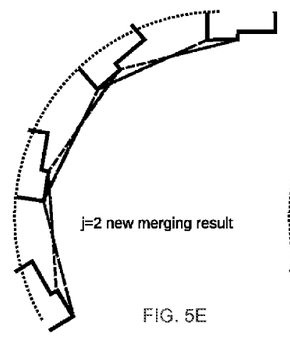
Figure 5F:
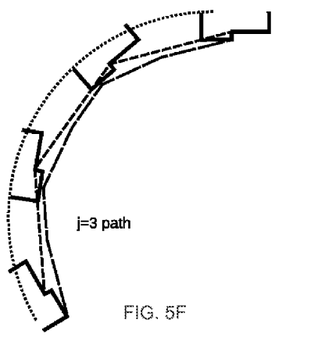
Figure 5G:
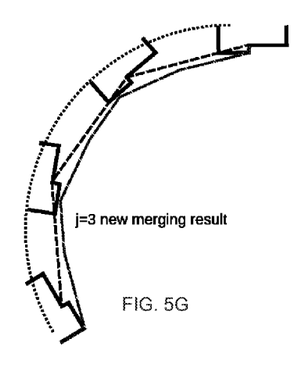
Figure 5H:
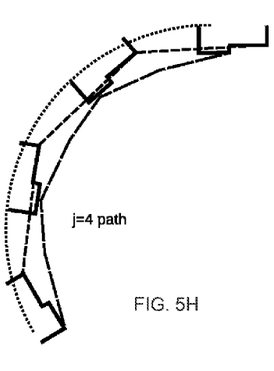
Figure 5I:
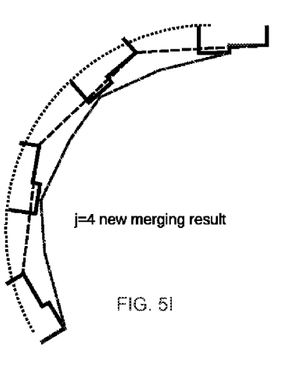
Figure 5J:
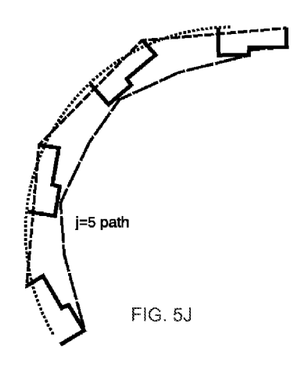
Figure 5K:
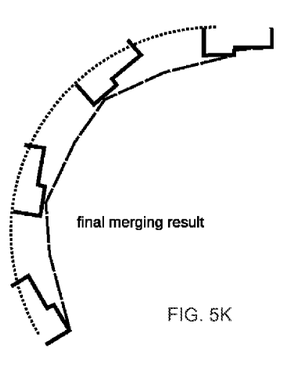

The motion prediction module is provided with the static and dynamic parameters. In return, it produces a sequence of vehicle configuration states 26, 27, 28, 29 (as shown in FIG. 4), beginning with the initial position and heading as provided in the dynamic parameters. A more complex vehicle may have more configuration variables beyond position and heading. For example, a tractor towing a grain cart would have a hitch angle, which may even be represented as a range to account for uncertainty in the trailer location.

The typical motion prediction module assumes that the vehicle will maintain a constant steering angle over the estimated course, and thus the path will be circular with a constant radius of curvature. If the predicted final heading of the vehicle, after traveling a given travel distance, differs from the initial heading by less than the small angle threshold, then the result sequence will contain only two configurations: initial and final. Otherwise, the result will contain a minimum of three configurations, and enough so that the heading change between any two adjacent configurations does not exceed the maximum interpose angle.

The sequence of vehicle configurations is passed to the static pose generation module to create two corresponding sequences of polylines (i.e., open polygon paths) as shown in FIG. 4. The first sequence provides estimates of the shape of the right half 30 of the vehicle for each configuration; the second sequence does the same for the left half 32. The points in a polyline are preferably ordered from the rear of the vehicle to the front. The points can be at the corners between segments of the shape or somewhere along a segment, e.g., mid-segment. For example, FIG. 4 shows points j=0, j=1, j=2, j=3, j=4, and j=5 for a right-side polyline 30. The number of points in a polyline may be tuned to trade accuracy for speed, but the generated polylines are preferably conservative, in the sense that the entirety of the modeled vehicle is contained within their boundary. Furthermore, all polylines in a given pose sequence generated by the pose generation module should have the same number of points. In addition, points at a given index in the polylines should correspond to the same location on the boundary of the vehicle.

Pose Polygon Merging

Figure 6:
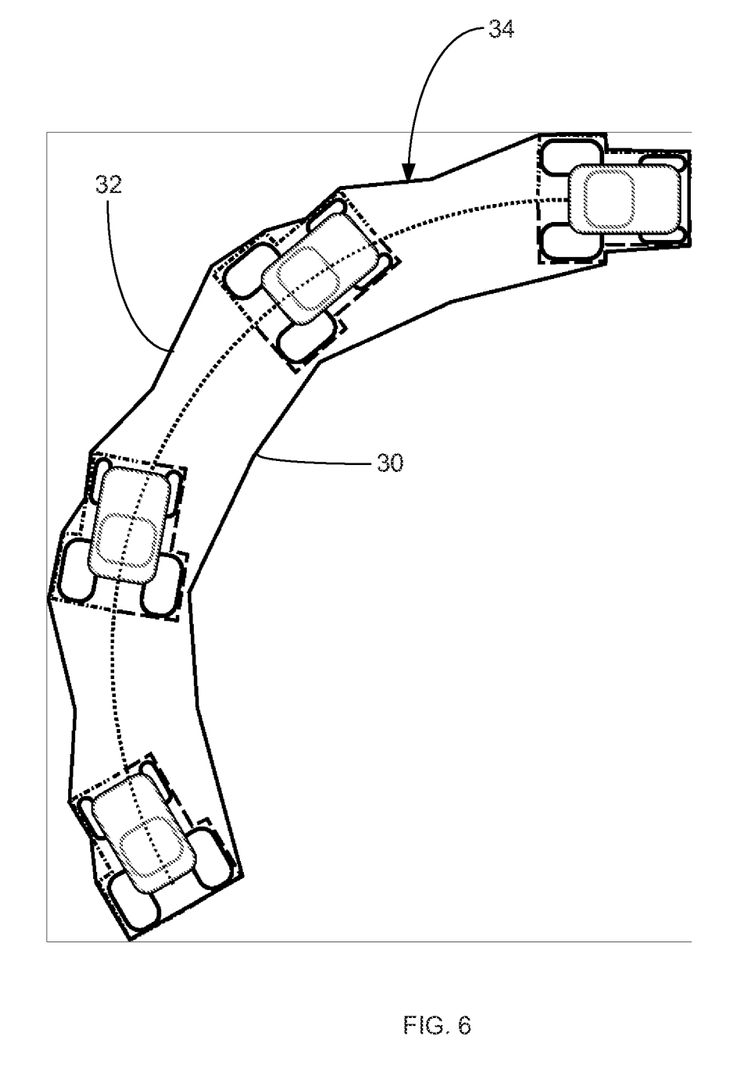
FIG. 6 is a simplified diagram illustrating formation of a final closed polygon from merging the right side and left side polylines.

The individual polylines of a sequence of one-sided static pose polylines are then merged together to produce a single polyline as illustrated in FIGS. 5A-5K. The merged polylines for the left side 32 and the right side 30 of the vehicle are then combined to form a single closed polygon 34 as shown in FIG. 6.

FIGS. 5A-5F illustrate the beginning iterations of merging on the right side for dual polylines from points j=0 to j=3. FIGS. 5G-5K illustrate the final iterations of merging on the right side for dual polylines from points j=3 to j=5.

The merging is first performed on the right-side sequence, as follows:
1. If the interpolated point count is non-zero, then each segment of a pose polyline is subdivided into interpolated point count additional segments, by adding interpolated point count additional points evenly spaced over the segment.
2. A dual set of polylines is constructed, all with the same number of points, in which the jth dual polyline reflects a straight-line approximation of the motion of the jth point of a pose polyline as the vehicle transits from its initial to final position. The jth dual polyline is constructed as the concatenation of:
 1. The first j−1 points of the first pose polyline.
 2. The jth point of each pose polyline, in order from first to last.
 3. The j+1 and subsequent points of the last pose polyline.
3. Initialize the merging result to be the first dual polyline.
4. Iterate over the remaining dual polylines, updating the merging result to the right polyline intersection of the current merging result and current dual polyline.
5. Finally, return the last merging result.

Merging is also performed on the left-side sequence. In accordance with one exemplary embodiment, merging on the left-side sequence can be performed by first taking its mirror image (the sequence of mirror images of its component paths), then applying the right-side merge algorithm shown above, then taking the mirror image of the result. Alternately, a separate a left-side merge algorithm can be used similar to the right-side merge algorithm, without using mirror images.

The left- and right-side open merged paths 32, 30 are then combined to result in a final closed polygon 34 as shown in FIG. 6.

Right Polyline Intersection

In accordance with one or more embodiments, the right path intersection operation combines two possibly-intersecting polylines to produce a single path with maximal rightmost extent, where "right" is defined with respect to the forward direction of motion of the vehicle:

---

1. Assign the first and second polyline arguments to variables Right and Left, arbitrarily.
2. Create an empty polyline named Result.
3. While Right comprises at least 2 points, iterate over the following steps:
  1. Assign the first segment of Right to right-segment.
  2. If the first and last point of right-segment are equal (zero-length segment), then discard the first point of Right and skip the rest of this iteration, returning to step 3 above.
  3. Iterate over all points in Left, except for the last, as point P:
   1. Assign the segment composed of P and the subsequent point to left-segment.
   2. If left-segment is a zero-length segment, return to step 3.3 above, skipping to the next point in Left.
   3. If right-segment and left-segment are congruent, then:
    1. Add the first point of Right to Result.
    2. Remove the first point of Right.
    3. Discard all points up to and including P from Left.
    4. Return to step 3 above (checking the size of Right. . . ).
   4. If right-segment and left-segment share the same initial point:
    1. Determine if the final point of left-segment lies to the right or left of right-segment.

-continued

2. If to left, then return to step 3.3 and continue with the next point of Left.
   3. If to right, then:
    1. Discard all points of Left preceding P (but not including P).
    2. Swap Left and Right.
    3. Start over again at step 3 (check the size of Right. . . ).
  4. If neither to left nor to right, then right-segment and left-segment are collinear:
   1. Discard all points of Left preceding (but not including) P.
   2. Subdivide the longer of the two segments by inserting the final point of the shorter segment.
   3. Start over again at step 3 (check the size of Right...).
  5. If right-segment and left-segment intersect elsewhere than their initial point, then:
   1. Assign the computed intersection to the variable Q.
   2. Append the initial point of right-segment to Result.
   3. Insert Q into the appropriate spots in both Right and Left, and discard all preceding points from both Right and Left.
   4. Start over again at step 3 (check the size of Right. . . ).
 4. Add the first point of Right to Result, and remove it from Right.
4. Add the first (and also last) point of Right to Result.
5. Return Result.

---

Left Polyline Intersection

The left path intersection operation combines two possibly-intersecting polylines to produce a single path with maximal leftmost extent. The left path intersection operation is obtained by transposing "left" and "right" in the right polyline intersection operation described above.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

What is claimed is:
1. A computer-implemented method of predicting an area to be traversed by a moving vehicle as it travels a given distance, the method comprising the steps of:
 (a) receiving, at a computer system, one or more dynamic parameters describing a state of the vehicle at a given time including a current speed, yaw rate, initial position, and initial heading of the vehicle;
 (b) generating, by the computer system, a sequence of vehicle configuration states based on the one or more dynamic parameters, including at least an initial vehicle configuration state at the initial position of the vehicle and a final vehicle configuration state at a final position of the vehicle after the vehicle has traveled the given distance, each vehicle configuration state indicating an outline of a predicted area to be occupied by the vehicle at a different point in time as the vehicle travels the given distance;

(c) generating, by the computer system, two sequences of one-sided polylines corresponding to the sequence of vehicle configuration states generated in step (b), the two sequences of one-sided polylines comprising a right side sequence of one-sided polylines, each polyline outlining the right side of the vehicle for a vehicle configuration state and a left side sequence of one-sided polylines, each polyline outlining the left side of the vehicle for a vehicle configuration state;

(d) merging the right side sequence of one-sided polylines, by the computer system, to produce a single right side polyline, and merging the left side sequence of one-sided polylines, by the computer system, to produce a single left side polyline, and (e) combining the single right side polyline and the single left side polyline, by the computer system, to form a single closed polygon representing the predicted area to be traversed by the moving vehicle.

2. The method of claim 1, further comprising repeating steps (a) through (e) a plurality of times as the vehicle travels.

3. The method of claim 1, wherein the single closed polygon representing the predicted area to be traversed by the moving vehicle is used for path planning or in a real time collision avoidance system for the vehicle.

4. The method of claim 1, wherein step (a) further comprises receiving, at the computer system, one or more static parameters for the vehicle, said static parameters including a small angle threshold, a maximum interpose angle, and an interpolated point count for the vehicle, and wherein the sequence of vehicle configuration states is based on the one or more static parameters and the one or more dynamic parameters.

5. The method of claim 1, wherein the vehicle is assumed to maintain a constant steering angle over the given distance.

6. The method of claim 1, wherein if a predicted heading of the vehicle at the final position differs from the initial heading by a given threshold angle, then step (b) comprises generating a sequence of at least three vehicle configuration states.

7. The method of claim 6, wherein the number of vehicle configuration states generated in step (b) is based on the difference between the predicted heading of the vehicle at the final position and the initial heading of the vehicle.

8. The method of claim 6, wherein the number of vehicle configuration states generated in step (b) is determined such that the heading change between any two adjacent vehicle configuration states does not exceed a maximum interpose angle.

9. The method of claim 1, wherein the step of merging the right side sequence of one-sided polylines to produce a single right side polyline comprises repeatedly applying a right polyline intersection operation to merge two polylines to produce a single path with maximal rightmost extent.

10. The method of claim 1, wherein the step of merging the left side sequence of one-sided polylines to produce a single left side polyline comprises repeatedly applying a left polyline intersection operation to merge two polylines to produce a single path with maximal leftmost extent.

11. A computer system, comprising:
at least one processor;
memory associated with the at least one processor; and
a program supported in the memory for predicting an area to be traversed by a moving vehicle as it travels a given distance, the program containing a plurality of instructions which, when executed by the at least one processor, cause the at least one processor to:

(a) receive one or more dynamic parameters describing a state of the vehicle at a given time including a current speed, yaw rate, initial position, and initial heading of the vehicle;

(b) generate a sequence of vehicle configuration states based on the one or more dynamic parameters, including at least an initial vehicle configuration state at the initial position of the vehicle and a final vehicle configuration state at a final position of the vehicle after the vehicle has traveled the given distance, each vehicle configuration state indicating an outline of a predicted area to be occupied by the vehicle at a different point in time as the vehicle travels the given distance;

(c) generate two sequences of one-sided polylines corresponding to the sequence of vehicle configuration states generated in (b), the two sequences of one-sided polylines comprising a right side sequence of one-sided polylines, each polyline outlining the right side of the vehicle for a vehicle configuration state and a left side sequence of one-sided polylines, each polyline outlining the left side of the vehicle for a vehicle configuration state;

(d) merge the right side sequence of one-sided polylines to produce a single right side polyline, and merge the left side sequence of one-sided polylines to produce a single left side polyline, and (e) combine the single right side polyline and the single left side polyline to form a single closed polygon representing the predicted area to be traversed by the moving vehicle.

12. The system of claim 11, wherein (a) through (e) are repeated a plurality of times as the vehicle travels.

13. The system of claim 11, wherein the single closed polygon representing the predicted area to be traversed by the moving vehicle is used for path planning or in a real time collision avoidance system for the vehicle.

14. The system of claim 11, wherein (a) further comprises receiving one or more static parameters for the vehicle, said static parameters including a small angle threshold, a maximum interpose angle, and an interpolated point count for the vehicle, and wherein the sequence of vehicle configuration states is based on the one or more static parameters and the one or more dynamic parameters.

15. The system of claim 11, wherein the vehicle is assumed to maintain a constant steering angle over the given distance.

16. The system of claim 11, wherein if a predicted heading of the vehicle at the final position differs from the initial heading by a given threshold angle, then (b) comprises generating a sequence of at least three vehicle configuration states.

17. The system of claim 16, wherein the number of vehicle configuration states generated in (b) is based on the difference between the predicted heading of the vehicle at the final position and the initial heading of the vehicle.

18. The system of claim 16, wherein the number of vehicle configuration states generated in (b) is determined such that the heading change between any two adjacent vehicle configuration states does not exceed a maximum interpose angle.

19. The system of claim 11, wherein (d) merge the right side sequence of one-sided polylines to produce a single right side polyline comprises repeatedly apply a right polyline intersection operation to merge two polylines to produce a single path with maximal rightmost extent.

20. The system of claim 11, wherein the (d) merge the left side sequence of one-sided polylines to produce a single left side polyline comprises repeatedly apply a left polyline intersection operation to merge two polylines to produce a single path with maximal leftmost extent.

21. A computer program product for predicting an area to be traversed by a moving vehicle as it travels a given distance, the computer program product residing on a non-transitory computer readable medium having a plurality of instructions stored thereon which, when executed by a computer processor, cause that computer processor to:
   (a) receive one or more dynamic parameters describing a state of the vehicle at a given time including a current speed, yaw rate, initial position, and initial heading of the vehicle;
   (b) generate a sequence of vehicle configuration states based on the one or more dynamic parameters, including at least an initial vehicle configuration state at the initial position of the vehicle and a final vehicle configuration state at a final position of the vehicle after the vehicle has traveled the given distance, each vehicle configuration state indicating an outline of a predicted area to be occupied by the vehicle at a different point in time as the vehicle travels the given distance;
   (c) generate two sequences of one-sided polylines corresponding to the sequence of vehicle configuration states generated in (b), the two sequences of one-sided polylines comprising a right side sequence of one-sided polylines, each polyline outlining the right side of the vehicle for a vehicle configuration state and a left side sequence of one-sided polylines, each polyline outlining the left side of the vehicle for a vehicle configuration state;
   (d) merge the right side sequence of one-sided polylines to produce a single right side polyline, and merge the left side sequence of one-sided polylines to produce a single left side polyline, and
   (e) combine the single right side polyline and the single left side polyline to form a single closed polygon representing the predicted area to be traversed by the moving vehicle.

* * * * *